Sept. 3, 1963
K. E. W. EINERMAN
3,102,692
VEHICLE LIGHTING SYSTEM
Filed Dec. 14, 1959
2 Sheets-Sheet 1
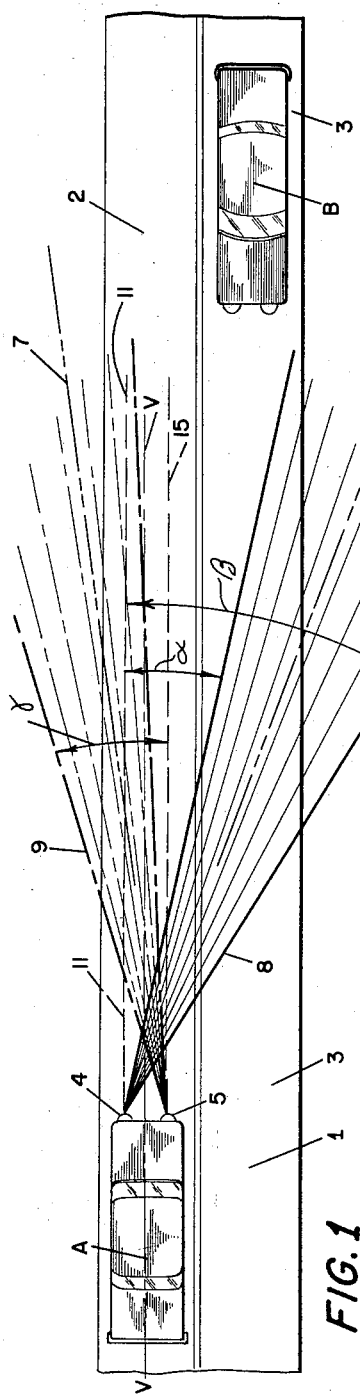
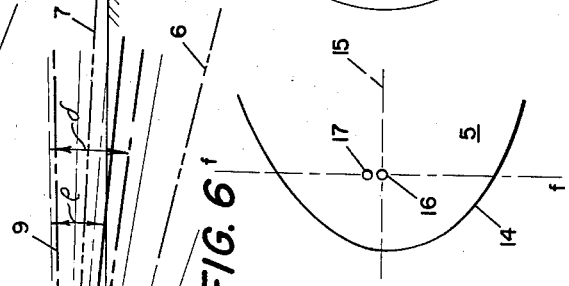
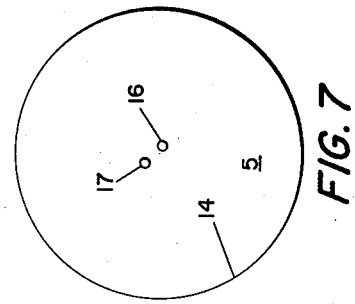
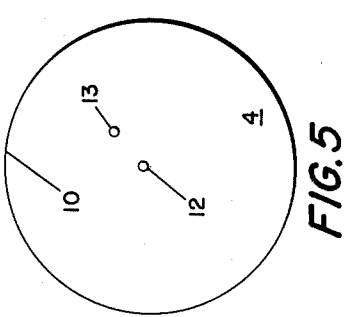
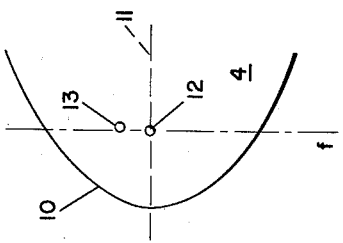
INVENTOR
BY
ATTORNEY

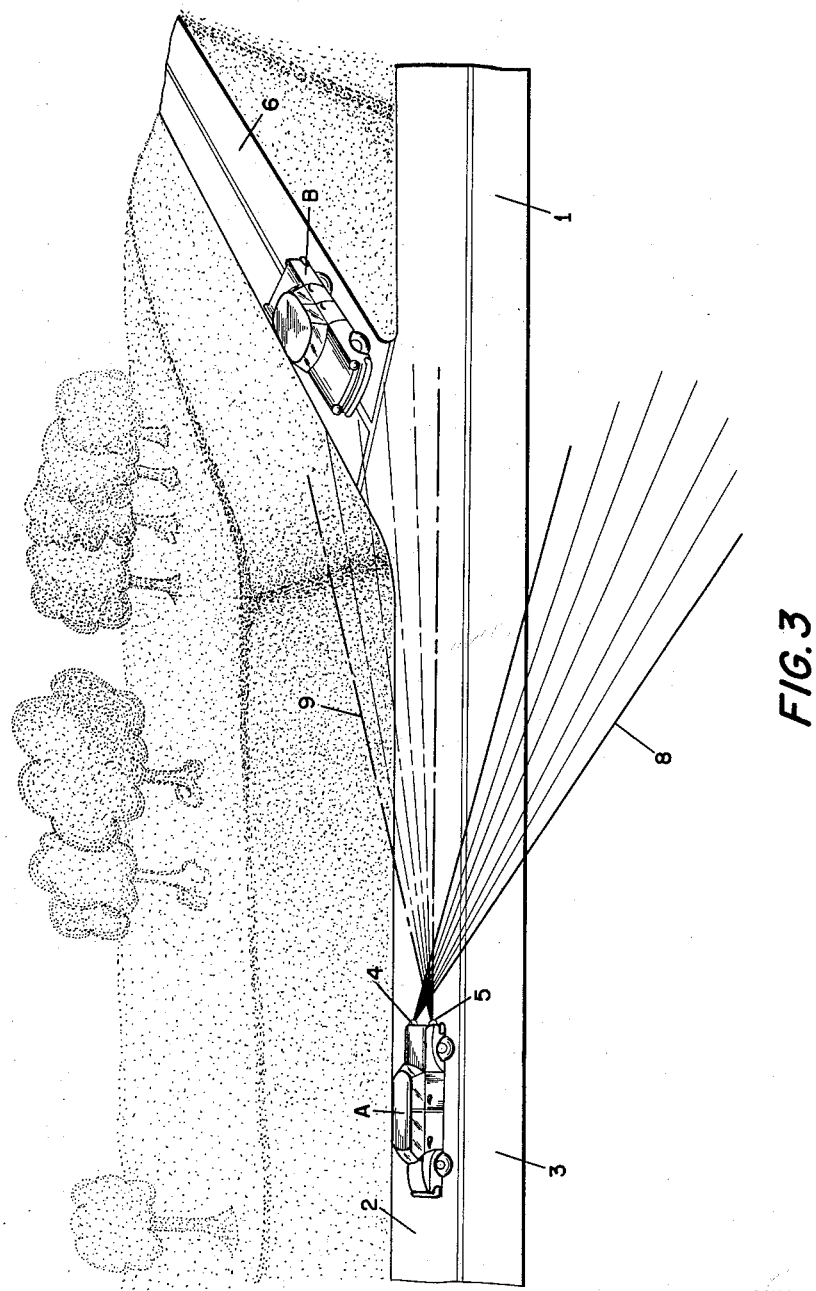

United States Patent Office 3,102,692
Patented Sept. 3, 1963

3,102,692
VEHICLE LIGHTING SYSTEM
Kurt Elis Wilhelm Einerman, Skottskogsgatan 99,
Gothenburg, Sweden
Filed Dec. 14, 1959, Ser. No. 859,386
Claims priority, application Sweden Dec. 17, 1958
2 Claims. (Cl. 240—7.1)

The present invention relates to headlights for vehicles, and an object of the invention is to provide a satisfactory illumination in the dark such that the roadway in front of the vehicle appears in sufficiently good illumination to make safe driving possible and wherein the illumination of the roadway from the headlights does not dazzle the driver of a meeting vehicle. In the following, the first vehicle will for simplification be called the A-vehicle, whereas the meeting vehicle will be called the B-vehicle.

For many years, technicians have been occupied with the problem of providing satisfactory illumination conditions in order to obtain these requisite safety conditions. Hitherto known methods and arrangements have not, however, proven satisfactory. Mainly, there have been two lines of procedure, of which one has consisted in the provision of a limited light which would not dazzle the driver of the B-vehicle, and of which the other has consisted in an attempt to neutralize or render harmless an illumination by the use of screens or the like directly by the driver, by which one endeavoured to weaken the light falling on the driver to prevent dazzling.

Under especially favorable circumstances, both of these methods have provided an acceptable result, but both the A-vehicle and the B-vehicle were provided with an effective dimmer arrangement which was used. Unfortunately, the shortcomings are still considerable. Many vehicles are provided with an imperfect arrangement in said respect, and very often a driver of a vehicle which, perhaps, is provided with satisfactory dimmer arrangements, does not use them when meeting another vehicle. In these cases, the risk of dazzling at least one driver, and in many cases both drivers, is great and quite a number of accidents have been caused thereby.

The present invention is based upon careful study of the reaction of the eye with respect to different light intensity as well as with respect to the speed of change and the measure of change of the illumination, and these investigations have been especially directed toward the problem of finding the reaction times occurring. Thereby, a phenomenon has been observed which to some extent can be regarded as basic for the present invention.

It is assumed for this problem that a person in dark surrounding has kept his eyes directed on to a well illuminated field, which field has thus shaped a picture on the retina of each eye within its optical field. It is further assumed that, as always during the driving of motor cars, the eyes have been in slight movement in order to incorporate transiently within this field the lateral parts of the landscape in front, under corresponding accommodation of the eyes. Depending upon the amount of light entering each eye, this has assumed a rather stable adaptation state.

If suddenly, the strong illumination of the well illuminated field in the landscape were to cease, and instead, the lateral fields are strongly illuminated and the central field only weakly illuminated; and considering the fact that the lateral parts of the retina are mainly determining the adaptation, one would now expect a rapid readjustment of the adaptation with the consequence that the weakly illuminated central field would appear as practically completely dark. This is, however, not the fact until after an essential time. The explanation of this is not yet ophthalmologically unraveled, but there is a theory to the effect that it would be connected with essentially different reaction speeds with regard to changed illumination conditions of the rods and cones of the retina, which does make overlapping of time possible between "darkness seeing" and "light seeing."

This phenomenon is manifested because the person concerned, who is still keeping the yellow spot of the retina and the adjacent range for clear sight directed on to the central dark field, is able to observe objects within this field with good vision without being dazzled by light entering from outside said field for up to several seconds, or even close to one minute, dependent upon individual circumstances.

The circumstances are, however, certainly still more complicated, because it is known that the visual perception, i.e., registration in the brain of that registered by the rods and cones of the retina and the pulses communicated by them through the nuclear layer to the optical nerve, enters with a displacement of time that is dependent on the amount of light fed to the rods and cones. However, it is not definitely known how this displacement of time varies during its dynamic state, but only that during the static state the displacement of time will be greater as the light is weaker. Thus, to what extent these circumstances influence the above mentioned phenomenon has not been ascertained.

The invention can therefore be said to be based upon an empirical observation which has not yet been theoretically determined.

The invention now consists in the A-vehicle re-directing its beam lights, when entering into a meeting with a B-vehicle, in such a way that two different bundles of light are emitted. The one is situated so that it ranges from about the middle of the road to the side of the road on which the A-vehicle is driven including the countryside there beyond, thus for right-hand traffic on the right road-side and for left-hand traffic on the left road-side. The other beam of light is situated within a field which extends from a line, forming an essential angle with the longitudinal direction of the road to a line further out to the countryside on the side of the road on which the B-vehicle is driven. The first beam of light should, preferably, be directed slightly downwards, and the second one directed rather strongly downwards.

Further details of the invention will be evident from the following description of the general principle and different embodiments of the invention in connection with the attached drawings, in which FIG. 1 shows the light distribution circumstances in the horizontal level at a meeting on straight road, FIG. 2 shows the corresponding light distribution circumstances in the vertical level at meeting on straight road, FIG. 3 shows a perspective view of the light distribution circumstances at meeting in a curve illustrated by a side-road, entering into the main road, FIGS. 4 and 5, respectively, show the position of the incandescent bodies in the one headlight in a picture from the side and from the front, respectively, and FIGS. 6 and 7, respectively, shown in a corresponding way the position of the incandescent bodies in the other headlight on the A-vehicle.

In FIGS. 1, 2, and 3, the A-vehicle is indicated by "A," and the B-vehicle by "B." It is of no essential importance to the invention what dimmer arrangements are on the B-vehicle, as only the dimmer arrangements on the A-vehicle will be described here. But of course, it is advantageous if both vehicles are provided with dimmer arrangements according to the present invention.

In the usual manner, the A-vehicle is provided with two headlights 4 and 5 in a horizontal plane equally spaced and on opposite sides of an extended vertical center plane V through the vehicle, which headlights in their normal state emit two strong light cones in a forward direction, thereby well illuminating the road 1 in front of the vehicle. These light cones are directed in the conventional way and should therefore not require any further explanation. The light distribution according to the present invention is accomplished at a recoupling of the headlights to other illumination in the headlights or at the taking of other steps for re-directing the light to make a safe meeting possible, and only this light distribution has been shown in FIGS. 1, 2, and 3. It should be realized that the meeting is assumed to take a rather short time, and that therefore the ability to see the road and the surroundings during this short time without being dazzled is important. Of course, once the meeting is completed, a recoupling to normal headlight illumination will take place in the usual way.

The vehicle A in FIGS. 1 and 2 is, thus, provided with two normal headlights 4 and 5 which differ from the commonly used conventional headlights by the way in which the illumination source for dimmed illumination is applied. This is applied in such a way that the described flow of light according to the invention will be created. In FIGS. 1 and 2, it has been assumed that the vehicles are driven in left-hand traffic in the lane 2, but the arrangement according to the invention is of course also available for vehicles in right-hand traffic. From the left headlight 4 of the A-vehicle, a light cone 8 of rather large width and with a cone axis 6 and well defined edge rays is emitted. This light cone 8 is divided between an angle α relative to the longitudinal direction of the roadway as defined by the longitudinal axis 11 parallel to the vertical center plane V, and an angle β relative to the same longitudinal direction. In the shown form of execution, the angle α is equal to 12.5°, whereas the angle β is equal to 35°. The angular horizontal beam width of the beam will, therefore, be 22.5°. The horizontal beam width from the headlight 5 to the right on the vehicle is spread from a limit line, mainly coinciding with the longitudinal direction of the road 1 and the corresponding headlight longitudinal axis 15, to an angle γ of 15° from the longitudinal axis 15 and the longitudinal direction of the road. In order to make it easy to separate the two beams from each other, the beam 8 has been drawn with full lines, the latter one, or beam 9 including beam axis 7, with dash-dot-lines.

In FIG. 2, the vertical beam width of same two beams is shown. It is seen from FIG. 2 that the beam 8 from the left headlight 4 is directed rather strongly downwards, viz. between an angle ρ of 6° and an angle μ of 22° below the horizontal level h, whereas the beam 9 from the right headlight 5 is directed somewhat higher, viz. from about the horizontal level h to an angle δ of 10° below the horizontal level h. It is therefore obvious, from FIG. 1, that the beam axis 6 will intersect the vertical center plane V nearer to the vehicle, and therefore at a greater angle, than will the beam axis 7 intersect the vertical center plane V. Moreover, the same beam axis 6 is directed downwardly from the horizontal at a greater angle than the beam axis 7.

It is now evident that with this orientation of the beams from the two headlights, a strong illumination of objects on the side of the road will be created, whereas the right half 3 of the road will get no illumination other than a diffuse illumination by re-radiation from such objects. Thus is created the state wherein the picture of a dark field with very little illumination is concentrated on the yellow spot of the retina, whereas the lateral parts of the retina are influenced by light from strongly illuminated fields. But because of the empirically determined phenomenon, the driver of the A-vehicle will still see the whole roadway 1 in front of the vehicle during a given time sufficient to allow the meeting to be completed. The driver of the A-vehicle can therefore safely drive on with a good view of the whole range of vision.

The driver of the B-vehicle will be subject to the action that, due to the sidewardly and downwardly directed flow of light from the left headlight 4 of the A-vehicle, all of the flow of light will fall so low that it will not hit the windshield of the B-vehicle or the eyes of its driver. Even if the windshield of B-vehicle should be situated exceptionally low, the light will hit the front of the B-vehicle at a strongly inclined angle, which, as well known, contributes to a decrease of the dazzling risk.

Of course, the driver of the B-vehicle should dim his light. But even if he should omit to do so, no essential dazzling effect will occur to the driver of the A-vehicle, because his eyes are at that time, due to the strong lateral light, adapted for a high light intensity.

It should be observed that by the special distribution of light caused by the present invention, the total part of the road which is illuminated with a given intensity or more, is several times bigger than was usual at the earlier dimmer arrangements, and that therefore the total quantity of light, falling in the eyes of the driver of the A-vehicle, must also be assumed to be several times larger. Moreover, this light quantity will mainly hit the lateral parts of the retina and, as said above, these are the parts which determine the adaptation relations.

It is then also obvious that both drivers may pass each other without getting a worse illumination of the road than was available with earlier conventional dimmer arrangements; further that the driver of the A-vehicle will see the road almost as well as with the usual head-light illumination, even if this state will last only a short while, and finally that the driver of the B-vehicle will get an essential aid by the beam directed to the right from the left head-light 4 of the A-vehicle, which will illuminate his whole road-side all the way to the A-vehicle. On the other hand, the driver of the B-vehicle, who is assumed not to have an arrangement according to the present invention, will see practically nothing of what is behind the A-vehicle on the road.

A new problem, however, is created, namely the blackout effect whereby the driver can run into a stationary vehicle or a pedestrian or some other object on the road.

It is seen from the above, that the driver of the A-vehicle is not exposed to any such risk. For this kind of accident, the decisive factor has been partly positive and partly negative in character. At insufficient illumination, the driver of a vehicle to have observed objects or persons, where no such objects or persons existed, usually due to his observation of lights and shades on the roadway and caused by the surroundings which he was unable to analyze in time. He has then tried to avoid such imagined obstacles and the consequence has been a narrow escape or an accident. But, on the other hand, it may also occur that an object or a person actually was in the roadway, without the driver of the vehicle being able to see him or any shades or lights caused by him. He has then run straight into the object or the person.

It is seen from the above that both these kinds of erroneous observations are avoided by the invention, with respect to the driver of the A-vehicle. The invention can not avoid these disadvantages with respect to the driver of the B-vehicle, but he will, under no circumstances be in a worse position than he would otherwise have been, and as a rule he will get some aid from the headlights of the A-vehicle.

FIG. 3 is illustrative for the case that the vehicles, when first arriving in the meeting zone, have directions which are not fully opposite to each other. It is without essential importance for the matter, whether the vehicles meet in a curve or if they meet in the way, shown in FIG. 3, that is on a main road and on a turning road 6. It is seen from FIG. 3 that the beam from the left headlight 4 of the A-vehicle is quite harmless, but that it will illuminate the roadway of the main road 1 as an aid and information for the driver of the B-vehicle. The beam from the right headlight 5 of the A-vehicle will hit the front of the B-vehicle under such a strong vertical angle, that there will be no dazzling.

If the B-vehicle had, instead, entered a curve of the opposite bending or if he had come from a turning of the opposite direction, then the right headlight 5 of the A-vehicle would only have illuminated the road in front of the B-vehicle still better, and the left headlight of the A-vehicle would hit in front of the B-vehicle at a very great vertical angle and below the level where light could hit the windshield and the driver's eyes.

The advantage with an illumination of the kind here described is not only that dazzling effect is avoided and that, in spite of this, one will obtain a certain, initially rather good picture of the only faintly illuminated central field, and a good illumination of the lateral field. At earlier dimmer arrangements with downwards directed beams, one had, in order to decrease rather effectively the risk for dazzling the driver of a meeting vehicle, to direct the beam so strongly downwards, that the illuminated part of the middle of the road was limited to about 25 or 30 meters in front of the vehicle. At an arrangement according to the present invention this distance is extended to an essentially bigger range and in many a case can be up to 80 or 90 meters. With the conventional arrangement, the illumination of the roadside has been only about 60 meters, but it can also in this case be essentially longer, up to about 300 meters. The ability to observe what is on the roadside is of very great importance for a sure driving.

The headlight arrangement proper is very simple, once the principle for the illumination has been made clear. Now, as with other and conventional vehicle headlights, use can be made of a switching arrangement between two different illumination sources preferably within a common reflector.

For the man skilled in the art, there is no difficulty in placing the illumination sources or incandescent bodies in the correct way, once he has acquired knowledge about the basic principle of the present invention. FIGS. 4-7 therefore only indicate one chosen form of execution of the placing of the incandescent bodies in a pair of co-operating headlights, but the invention shall, of course, not be regarded to be limited to this special form of execution.

FIGS. 4 and 5 schematically show the left headlight 4 of the A-vehicle in section (FIG. 4) as well as from the front side (FIG. 5). Numeral 10 represents the reflector, preferably a known parabolic reflector having the longitudinal optical axis 11, and at the focal point of the parabolic reflector, the incandescent body 12 intended for normal headlight function is placed. The illumination source incandescent body 13 for illumination according to the present invention is applied excentrically relative to the focal point. Thus, it is arranged above the focal point, which causes the strong turning down of the beam from the left headlight, and it is also applied somewhat displaced to the left of the focal point, seen in the driving-direction, which causes the light from the headlight to be distributed between the above indicated angular positions α and β. The width of the angle between the two positions α and β is adjusted to a suitable value displacing the illumination source into a plane which is perpendicular to the optical axis 11 but placed behind or before the focal plane f.

In a corresponding way, FIGS. 6 and 7 schematically show the right headlight 5 of the A-vehicle. Its reflector 14 is shaped the same way as the reflector 10, and its optical axis 15 may preferably be provided in parallel to the optical axis 11. Its normal incandescent body 16 is also, in a manner similar to the incandescent body 12, arranged at the focal point of the reflector 14. The illumination source 17 for illumination according to the invention is also displaced sidewards as well as in vertical direction, but the amount of this displacement in both directions is less than at the left headlight 4. By this the beam is not directed downwards to the same high extent as the beam from the left headlight, and the beam will be spread out within an angular range from the longitudinal direction of the road to an angle γ from this longitudinal direction on the same side 2 of the road. Of course, the side displacement of the incandescent bodies 13 and 17 should take place in different directions.

It is suitable to arrange the two incandescent bodies inside a common lamp-bulb and to isolate them optically by cup-formed screens in a way known per se. It is also suitable to ensure a good ray-direction by a lamina means of any kind known per se, immediately inside the protection glass of the headlights. All such details will, however, be self-evident to the man skilled in the art, and they would therefore not require any special description in this connection.

What I claim is:

1. In a vehicle for use on a roadway having traffic oncoming toward one side of the vehicle, a headlight system comprising a first headlight mounted on the front of the vehicle at the side of the oncoming traffic; a second headlight mounted on the front of the vehicle at the other side thereof; the said headlights being in a horizontal plane and equally spaced from and on opposite sides of a projected vertical center plane extending along the longitudinal direction of the vehicle and each of the headlights further including a longitudinal axis extending along the longitudinal direction of the vehicle through the headlight and parallel to the said vertical center plane, each said headlight having means including an illumination source for projecting a conical beam of light having a beam axis and substantially well defined edges, each beam axis intersecting the center plane ahead of the vehicle and directed downwardly from the horizontal plane, the beams thereby crossing such that the second headlight illuminates the side having the oncoming traffic and the first headlight illuminates the other side, the beam axis of the projected beam of the second headlight intersecting the center plane and directed downwardly from the horizontal at angles greater than the corresponding angles for the beam axis of the projected beam of the first headlight, the entire beam of light from the second headlight being below the horizontal plane, the horizontal width of the conical beam of the second headlight extending from an angle of about 12½ degrees with the corresponding longitudinal axis of the second headlight to about 35 degrees with the longitudinal axis of the second headlight, and the horizontal beam width of the conical beam of the first headlight extending from about a coincidence with the corresponding longitudinal axis of the first headlight and parallel to the said vertical center plane to an angle of about 15 degrees with the longitudinal axis of the first headlight.

2. A headlight system according to claim 1 wherein the vertical beam width of the beam of the second headlight extends from about 6 degrees below the horizontal plane to about 22 degrees below the horizontal plane, and the vertical beam width of the beam of the first headlight extends from about a coincidence with the horizontal plane to an angle of about 10 degrees below the horizontal plane.

References Cited in the file of this patent

UNITED STATES PATENTS

| | | |
|---|---|---|
| 1,861,883 | Russell | June 7, 1932 |
| 2,076,074 | Douglass | Apr. 6, 1937 |
| 2,214,472 | Lund | Sept. 10, 1940 |
| 2,253,615 | Falge et al. | Apr. 26, 1941 |
| 2,611,857 | Coulter | Sept. 23, 1952 |
| 2,843,778 | Falge | July 15, 1958 |

FOREIGN PATENTS

| | | |
|---|---|---|
| 160,316 | Switzerland | May 1, 1933 |